United States Patent [19]

Sederquist

[11] 4,128,700

[45] Dec. 5, 1978

[54] FUEL CELL POWER PLANT AND METHOD FOR OPERATING THE SAME

[75] Inventor: Richard A. Sederquist, Newington, Conn.

[73] Assignee: United Technologies Corp., Hartford, Conn.

[21] Appl. No.: 855,118

[22] Filed: Nov. 26, 1977

[51] Int. Cl.$^2$ .............................................. H01M 8/06
[52] U.S. Cl. ........................................ 429/17; 429/19; 429/20
[58] Field of Search ...................... 429/17, 19, 20, 26

[56] References Cited

U.S. PATENT DOCUMENTS

| | | | |
|---|---|---|---|
| 3,972,731 | 8/1976 | Bloomfield et al. | 429/17 |
| 3,976,507 | 8/1976 | Bloomfield | 429/17 |
| 4,001,041 | 1/1977 | Menard | 429/17 |

*Primary Examiner*—Anthony Skapars
*Attorney, Agent, or Firm*—Stephen E. Revis

[57] ABSTRACT

In a fuel cell power plant the anode and cathode exhausts are combined and burned in a burner with a first portion of the burner exhaust being delivered into fuel conditioning apparatus to provide the heat for converting a carbonaceous fuel to hydrogen. The hydrogen is then fed to the anode side of the fuel cells. A second portion of the burner exhaust is preferably used to drive a turbocharger for compressing the fuel cell oxidant which is usually air. If the fuel cells do not operate on pressurized reactants, then the energy in the second portion of the burner exhaust can be used for any other suitable purpose.

20 Claims, 3 Drawing Figures

FUEL CELL POWER PLANT AND METHOD FOR OPERATING THE SAME

BACKGROUND OF THE INVENTION

1. Field of the Invention

The present invention relates to fuel cell power plants.

2. Description of the Prior Art

As fuel cell power plants for producing electricity come closer to commercial reality more and more effort is being directed to improving the efficiency of the power plant and the cost of the power plant without the necessity for developing new and improved materials and components. One approach is to eliminate or reduce the size of existing components such as by altering the order of arrangement of components in an effort to make more efficient use of the available energy in various gas streams. Other techniques for improving efficiency and reducing cost may include modifying the operating parameters of the system. An example of efforts along both of these lines resulted in the power plant configurations shown and described in commonly owned U.S. Pat. No. 3,976,507. The power plant shown therein used pressurized reactants by incorporation of a turbocharger driven by what otherwise might have been wasted energy produced within the power plant. Coupled with the pressurizing of the power plant was the use of cathode gas space exhaust in a fuel reactor to produce hydrogen, the reactor exhaust being directed through various heat exchangers and thence through the anode gas space of the fuel cells. The anode exhaust, after increasing its temperature by passing it through a catalytic burner, was used to drive the turbocharger for compressing the air fed to the cathode gas space.

One advantage of the power plant described in the abovementioned U.S. patent is the elimination of water recovery apparatus because the steam needed by the reactor was present in the cathode effluent gases.

Despite the many advantages of the foregoing power plant it is not totally satisfactory. For example, any water liberated in the anode gas space exhaust is wasted in that it is not used in the reactor and therefore does not improve the performance of the reactor. Furthermore, a pressure drop across the reactor may result in a pressure imbalance across the fuel cell.

SUMMARY OF THE INVENTION

Accordingly, an object of the present invention is a fuel cell power plant which eliminates many of the problems of prior art power plants while at the same time reducing the cost of the power plant and improving its efficiency.

A fuel cell power plant according to the present invention comprises a plurality of fuel cells. The fuel cell anode and cathode exhaust are combined and burned in a burner, a first portion of the burner exhaust and a carbonaceous fuel being fed into fuel conditioning apparatus for converting the fuel to hydrogen which is then fed to the anode side of the fuel cells. A second portion of the burner exhaust is vented.

In a preferred embodiment, before being vented the second portion of the burner exhaust is used to drive a turbocharger for pressurizing air (oxidant) fed to the cathode side of the fuel cells. The burner exhaust can also be used to preheat the anode and cathode exhausts before they enter the burner.

In another embodiment the fuel conditioning apparatus includes a thermal gasifier disposed upstream of a steam reforming reactor. Burner exhaust and fuel are fed into the gasifier, and the gasifier exhaust is then fed to the reform reactor. The thermal gasifier includes a volume in which most of the heavy hydrocarbon compounds in the fuel are broken down to lighter species by the high temperatures within the gasifier volume. The lighter species can then be handled by a typical catalytic steam reformer. The thermal gasifier thus permits the power plant to be operated on unclean fuels such as heavy oils or even solid wastes.

The present invention has a number of advantages over the prior art. For example, all the steam needed by a steam reforming reactor is provided by the anode and cathode exhaust streams; since both streams are fed to the reactor less steam is wasted. The additional steam improves the performance of the reactor.

Another important advantage of the present invention is that a significant portion of the anode exhaust, after being combusted and then used in fuel conditioning apparatus, is fed (or "recycled") through the anode. As compared to the system of aforementioned U.S. Pat. No. 3,976,507, this increases the hydrogen partial pressure particularly at the anode exit and results in improved fuel cell performance and thermal efficiency.

Yet another important feature of the present invention, and one which improves the thermal efficiency of the entire power plant, is that the mixing and burning of the anode and cathode exhausts provides all of the heat energy needed to operate both the fuel conditioning apparatus for producing hydrogen and a turbocharger (assuming a pressurized system) for compressing the air fed to the cathode side of the fuel cells. If additional energy is needed in the fuel conditioning apparatus, the temperature therein can be increased by simply increasing the cathode air flow which will result in additional oxygen being fed to the apparatus.

A further advantage of the present invention is that the high temperature of the fuel conditioning apparatus inlet stream may permit the use of certain high sulfur content fuels (such as No. 2 heating oil) directly in a steam reformer even without the use of the aforementioned thermal gasifier.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
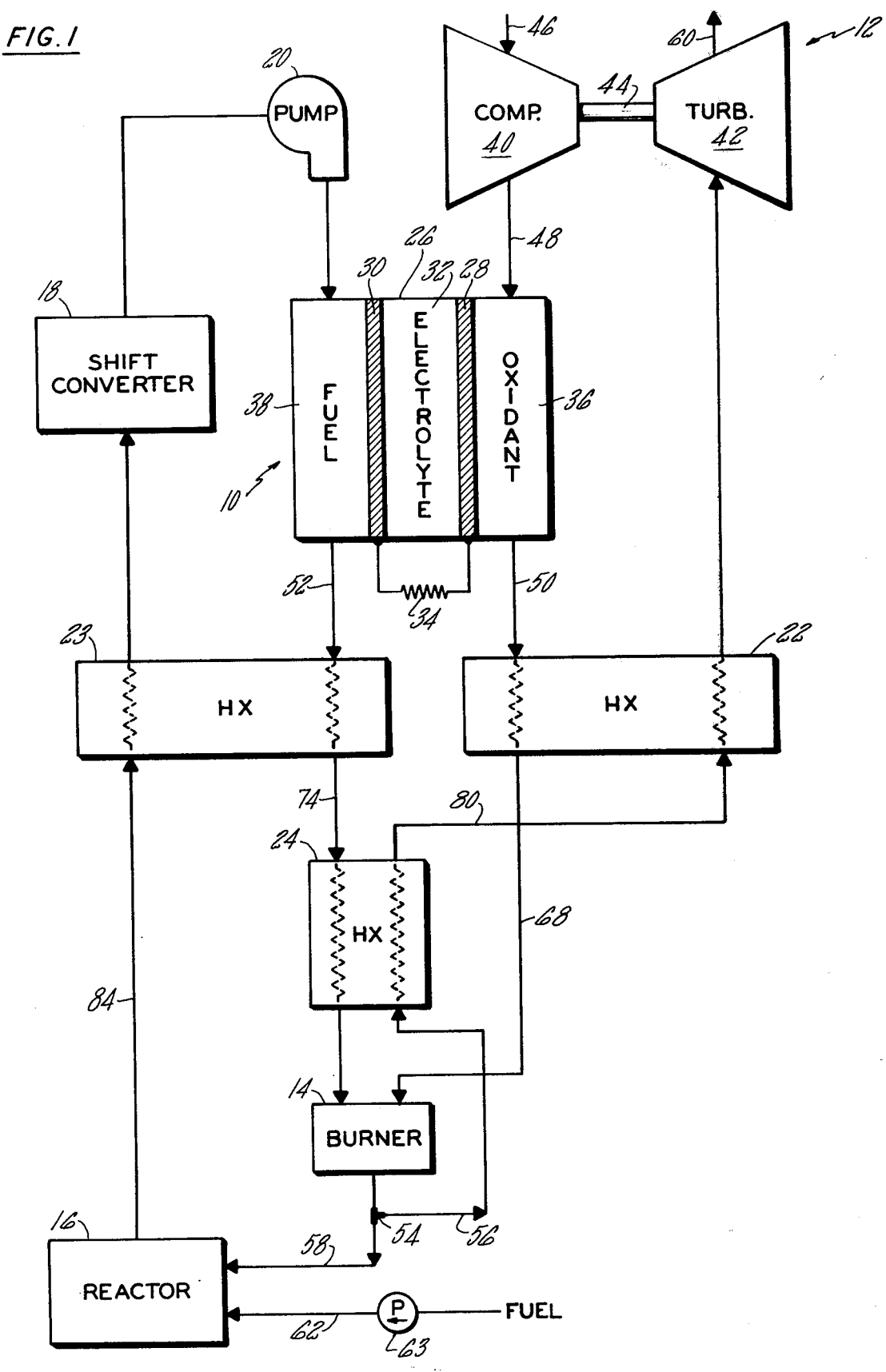
FIG. 1 is a schematic representation of a fuel cell power plant according to the present invention.

Consider, as an exemplary embodiment of the present invention, the power plant depicted schematically in FIG. 1. The power plant includes a fuel cell stack generally designated by the numeral 10, a turbocharger generally designated by the numeral 12, a burner 14, a fuel reactor 16, a shift converter 18, a recirculation pump 20, and heat exchangers 22, 23, and 24.

The stack 10 generally comprises a plurality of fuel cells connected electrically in series through a load, but for ease of explanation is herein depicted as only comprising a single cell 26. Each cell includes a cathode electrode 28 spaced from an anode electrode 30 with an electrolyte retaining matrix 32 disposed therebetween. The electrodes 28, 30 both include a platinum catalyst and are shown connected in series through a load 34.

The fuel cell stack 10 may comprise any conventional type of fuel cells which operate on gaseous reactants; in this embodiment the oxidant is air and the fuel is hydrogen. The oxidant flows adjacent the cathode electrode 28 through what is hereinafter referred to as the cathode side 36 of the cell 26; and the fuel flows adjacent the anode electrode 30 through what is hereinafter referred to as the anode side 38 of the cell 26. In this preferred embodiment the electrolyte is liquid phosphoric acid, but the invention is not intended to be limited thereto and other acid as well as base electrolytes, molten carbonate electrolytes, or solid types of electrolytes such as metal oxide electrolytes or solid polymer electrolytes are contemplated as being useful in a power plant designed according to the present invention.

The turbocharger 12 comprises a compressor 40 driven by a turbine 42 through a shaft 44. Its function will become more clear from the following description of the operation of the power plant.

Still referring to FIG. 1, in operation air enters the compressor 40 via a conduit 46, and is compressed to at least about two atmospheres of pressure. This pressurized air passes into the cathode side 36 of the fuel cell via a conduit 48. The oxygen in the air is electrochemically reacted within the cathode electrode 28 with the phosphoric acid electrolyte in the matrix 32. Some of the water produced by the reaction is evaporated back into the air stream flowing through the cathode side of the cell. The moist cathode exhaust leaves the fuel cell via a conduit 50, picks up heat in the heat exchanger 22 and is fed into the burner 14.

On the anode side 38 of the fuel cell hydrogen reacts electrochemically within the anode electrode 30 with the phosphoric acid electrolyte in the matrix 32. Some water also evaporates into this hydrogen stream flowing through the cell. The exhaust from the anode side 38 of the cell comprises, for the most part, unburned hydrogen and water. It leaves the cell via the conduit 52 and picks up heat in heat exchangers 23 and 24 before it is fed into the burner 14.

Within the burner 14 the preheated anode and cathode exhausts are mixed together and burned at a relatively high temperature which may be anywhere from 1800° to 2500° F. depending upon the initial temperatures of the fuel cell exhaust streams, the extent of preheating these streams prior to introducing them into the burner, and the ratio of oxygen to hydrogen. Preferably the burner temperature should be above 2000° F.

The exhaust from the burner is split at 54 into a vent stream 56 and a recycle stream 58. Usually the mass recycled is about twice the mass vented. The most desirable ratio will be determined by reactor heating and temperature requirements as well as by the required reactor steam to fuel ratio. The burner may be run at either a stoichiometric (no excess air) condition, or a higher than stoichiometric condition simply by increasing or decreasing the cathode air flow. When the burner is run at a higher than stoichiometric air flow the reactor automatically receives excess oxygen resulting in combustion as well as steam reforming therein. This will cause the reactor to operate at a higher temperature which may be desirable for certain kinds of fuels. In any event, the burner should not be operated with less than stoichiometric air, since this would result in the venting of unburned hydrogen in the vent stream 56.

The vent stream 56 is directed through the heat exchanger 24 to preheat the anode exhaust and through the heat exchanger 22 to preheat the cathode exhaust. It is then used to drive the turbocharger 12 by passing it through the turbine 42 whereupon it is exhausted to atmosphere via the conduit 60.

The recycle stream 58 of the burner exhaust is fed into the reactor 16. Fuel is also introduced into the reactor 16 via a conduit 62 and mixes with the burner exhaust. The liquid fuel is first increased in pressure by a pump 63 to about the same pressure as the air entering the cathode side 36 of the fuel cell. In this instance the reactor is a catalytic steam reformer which uses a nickel supported on alumina catalyst. Preferably the reactor operates adiabatically using only the sensible heat in the burner exhaust to convert the fuel to hydrogen. The burner exhaust includes the water (in the form of steam) necessary for the steam reforming reaction.

The reactor exhaust is used to preheat the anode exhaust in the heat exchanger 23 and is then delivered into the shift converter 18 to convert any carbon monoxide (a poison to the fuel cell) to carbon dioxide and additional hydrogen. From the shift converter 18 the gas stream is delivered into a pump 20 which feeds the fuel to the anode side 38 of the fuel cell. In the claims the reactor 16 and the shift converter 18 are referred to by the broader phrase "fuel conditioning apparatus".

One important feature of the power plant of the present invention is the recirculation of a significant portion of combusted anode and cathode exhaust to provide the energy to run the reactor which reforms the fuel. The major advantage of burning and recycling the anode exhaust is that it boosts the hydrogen partial pressure particularly at the exit of the anode side of the fuel cell. Also, since the power plant of the present invention uses water from both the anode and cathode exhausts, the only water which is lost is that present in the vent stream 56.

Although in the embodiment shown in FIG. 1 both the reactor exhaust stream and the vent gas stream are used to preheat the anode and cathode exhaust, the necessity for such preheating depends upon the operating temperature of the fuel cell being used in the power plant and the desired burner temperature. For example, solid electrolyte fuel cells often operate at temperatures greater than 1000° F. In that instance, preheating may not be necessary or may be required to a much lesser extent than would be required for lower temperature cells. Solid electrolyte cells would also not require the use of a shift converter since they are more tolerant to the presence of carbon monoxide in the anode side inlet stream.

The present invention is also not limited to pressurized systems. Of course, in unpressurized systems there would be no turbocharger; therefore, the energy in the vent gas stream may be put to other uses such as to raise steam to drive a turboelectric generator.

Figure 2:
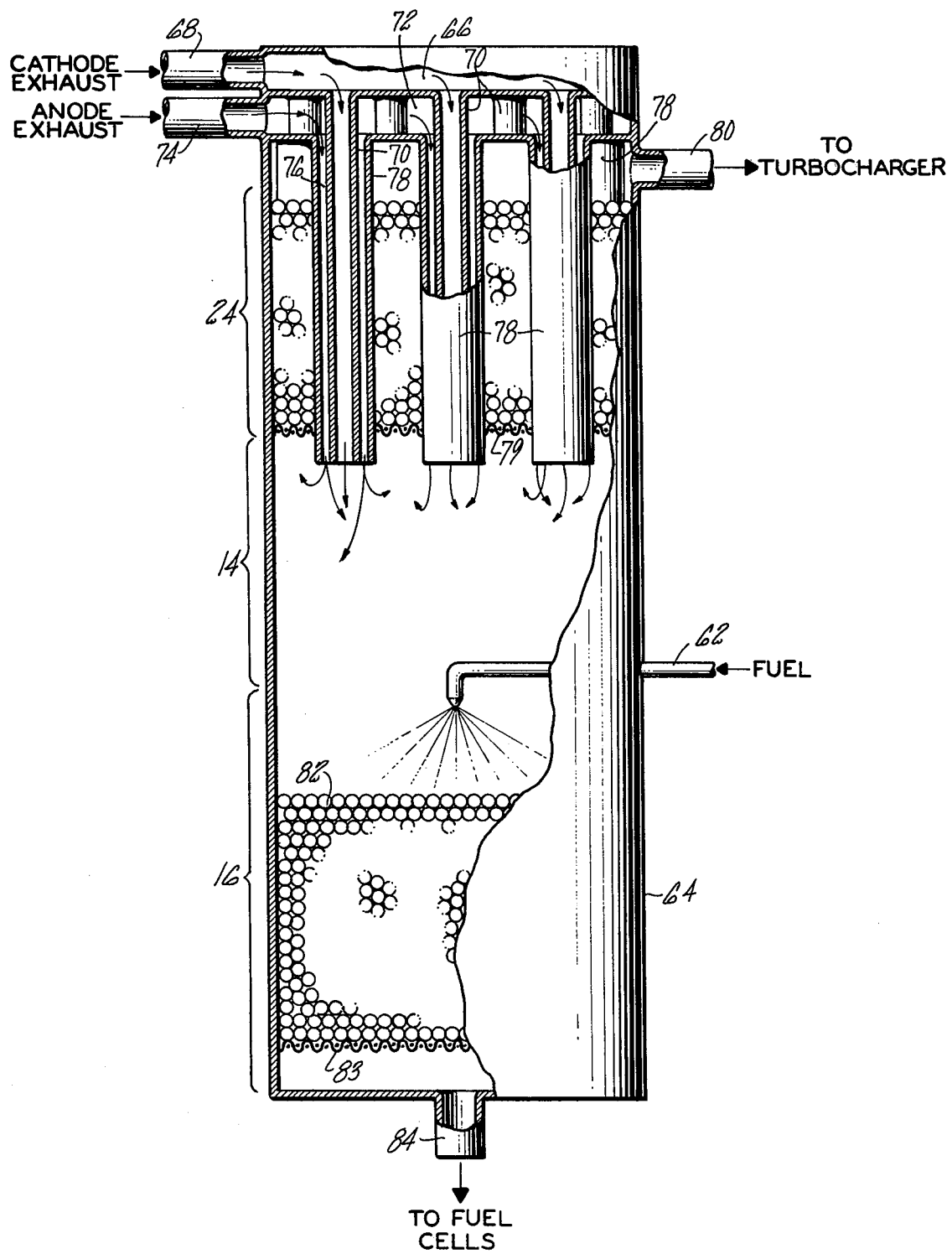
FIG. 2 is illustrative of a combined burner/heat exchanger/reactor apparatus useful in the power plant of FIG. 1.

Although in the embodiment of FIG. 1 the heat exchangers, burner and reactor are shown as being individual and separate components this need not and probably would not be the case. FIG. 2 is illustrative of a device which integrates the reactor 16, the burner 14, and the heat exchanger 24. As shown these components are housed within an internally insulated shell 64. Cathode exhaust from the heat exchanger 22 enters a manifold 66 via a conduit 68. From the manifold 66 the cathode exhaust travels through a plurality of tubes 70 to the burner 14, which herein is shown as an open volume inside the shell 64. The anode exhaust enters a manifold 72 via a conduit 74 and passes through annular spaces 76 which are formed by outer tubes 78 which surround the tubes 70. When the anode exhaust exits into the burner 14 and mixes with the depleted air of the cathode exhaust burning takes place.

Vertically disposed above the burner 14 is the heat exchanger 24; and below the burner 14 is the reactor 16. The heat exchanger 24 is a volume filled with ceramic heat transfer saddles surrounding the concentric tubes 70, 78. The saddles are supported by a screen 79. A portion of the hot burner gas circulates through this volume of ceramic saddles, preheating the anode exhaust which flows within the annuli 76. Part of this burner exhaust (the vent stream) exits through the conduit 80 which delivers it to the heat exchanger 22.

The remainder of the burner exhaust gases travels downward into the reactor 16. Fuel for the reactor is added to the burner exhaust via the conduit 62. The mixture of fuel and burner exhaust pass through the reactor catalyst bed 82 (supported by a screen 83) whereupon the fuel reacts with the steam in the burner exhaust in the presence of the catalyst to produce primarily hydrogen and carbon oxides. The heat energy in the burner exhaust drives the reaction, which is endothermic. The exhaust from the reactor leaves via a conduit 84 which directs it to the heat exchanger 23.

It should be kept in mind that the apparatus of FIG. 2 is only one example of how one might integrate several of the power plant components to accomplish some of the objectives of the present invention. Many other arrangements which are still within the teachings of the present invention are possible.

Figure 3:
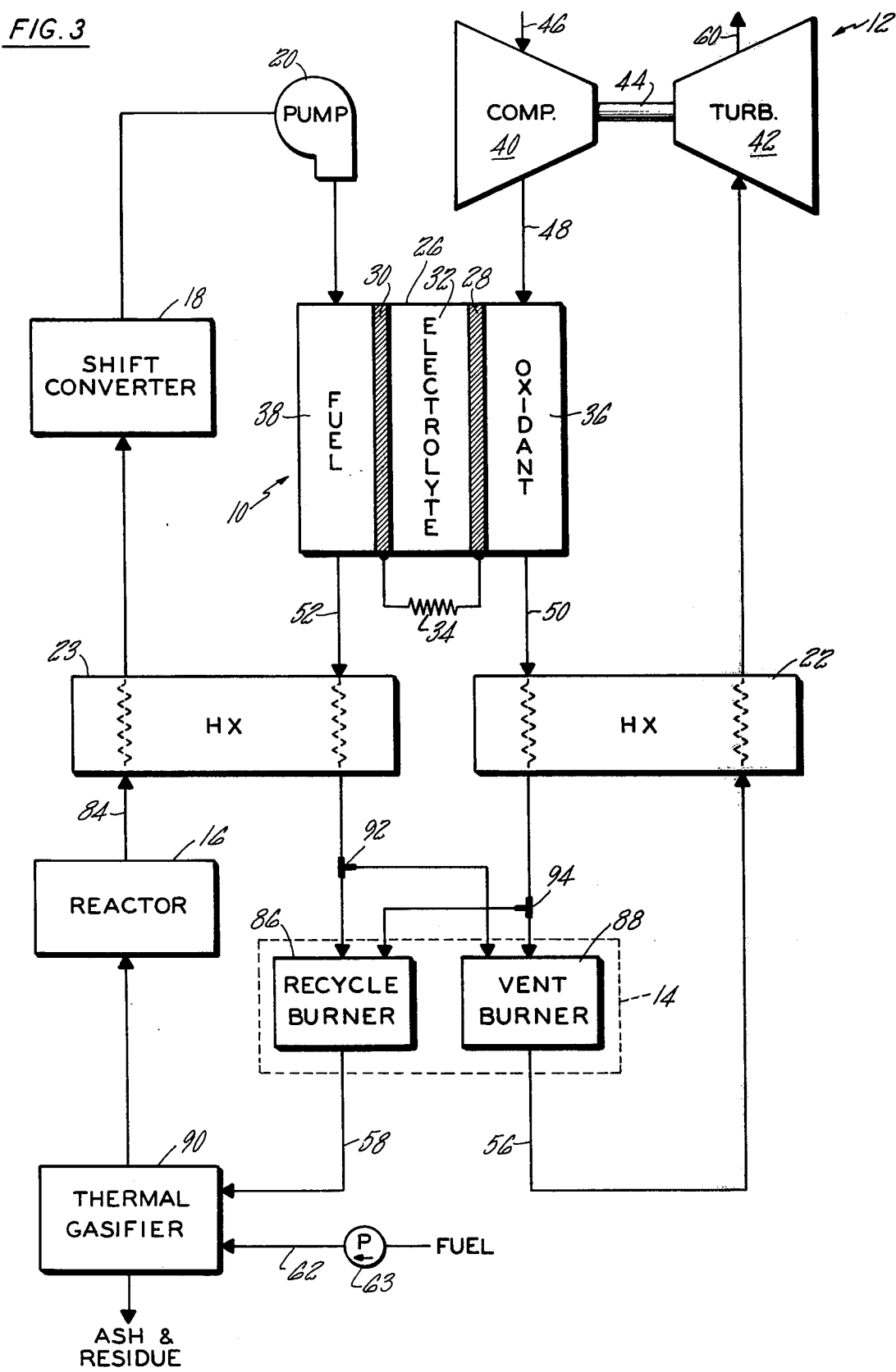
FIG. 3 is a schematic representation of a fuel cell power plant according to another embodiment of the present invention.

Referring now to FIG. 3, another embodiment of the present invention is shown. Components in the power plant of FIG. 3 which correspond to similar components in the power plant of FIG. 1 have been given the same reference numerals as were used in FIG. 1. This embodiment differs from the embodiment of FIG. 1 in three significant respects. First, two separate burners, a recycle burner 86 and a vent burner 88, are used instead of a single burner. Second, the fuel conditioning apparatus includes a thermal gasifier 90. And third, one less heat exchanger is used.

A thermal gasifier is basically just a large volume which serves to provide a long residence time during which the fuel may gasify. Thermal gasifiers are well known in the art and typically have an inlet temperature of 2100° and an outlet or exhaust temperature of 1800° to 1900°. The thermal gasifier 90 permits the use of virtually any fuel including heavy oils and even solid wastes, since at these temperatures heavy hydrocarbons in the fuel are converted to light hydrocarbons which can be handled without problem by standard catalytic steam reforming apparatus such as the reactor 16. Of course, the thermal gasifier would have to have provisions for removing ash and residue from the gasified fuel products. In this embodiment all the energy for the thermal gasification process is provided by that portion of the burner exhaust which is delivered into the thermal gasifier.

Referring now to the burner 14 in FIG. 3, the burner 14 comprises a recycle burner 86 and a vent burner 88. The anode exhaust is split at 92 and suitably divided between the recycle and vent burners (as opposed to being split after exhausting from the burner in the embodiment of FIG. 1). Similarly, the cathode exhaust is split at 94 and suitably divided between the recycle and vent burners. The exhaust from the recycle burner is delivered to the thermal gasifier and is eventually recycled through the fuel cell. The exhaust from the vent burner is used to drive the turbocompressor.

Some of the options of this arrangement, as compared to the arrangement of FIG. 1, are that the recycle burner can be operated at a different temperature from the vent burner as well as at different anode and cathode exhaust flow splits. This allows the recycle burner to be operated above, below or at stoichiometry depending on the desire to deliver either a hydrogen rich or oxygen rich recycle burner stream to the thermal gasifier (or to the reactor if there were no thermal gasifier). It may be recalled that in the embodiment of FIG. 1 it is preferred that the burner not be run below stoichiometry since part of the unburned hydrogen in the burner exhaust would be lost through the vent stream thereby reducing the efficiency of the power plant. On the other hand, in the embodiment of FIG. 3 it is preferred that the vent burner 88 be operated at or above stoichiometry to guarantee complete combustion and utilization of the energy (i.e., hydrogen) in that portion of the anode exhaust which is directed through the vent burner.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In the method of operating a fuel cell power plant comprising a plurality of fuel cells, burner means, and fuel conditioning apparatus including a catalytic reactor for producing hydrogen, the steps of:
   burning a mixture of fuel cell anode and cathode exhausts in said burner means;
   feeding a carbonaceous fuel and a first portion of the burner means exhaust into said fuel conditioning apparatus and reacting the fuel therein;
   feeding the fuel conditioning apparatus output to the anode side of the fuel cells; and
   venting a second portion of the burner means exhaust.

2. The method according to claim 1 wherein said fuel cells operate on pressurized air as the oxidant, and wherein said power plant includes a turbocharger for pressurizing the air fed to the cathode side of said fuel cells, the additional step of driving said turbocharger with said second portion of the burner means exhaust prior to venting said second portion.

3. The method according to claim 1 including the step of preheating at least one of either the anode exhaust or cathode exhaust prior to introducing the exhaust into the burner means, said preheating being accomplished using the heat in the burner means exhaust.

4. The method according to claim 2 wherein the burner means includes a recycle burner and a vent burner, each receiving a portion of the fuel cell cathode exhaust and a portion of the fuel cell anode exhaust, the first portion of the burner means exhaust being the recycle burner exhaust and the second portion of the burner means exhaust being the vent burner means exhaust.

5. The method according to claim 4 wherein the vent burner is operated at or above stoichiometric conditions.

6. The method according to claim 2 wherein said burner means operates at or above stoichiometric conditions.

7. The method according to claim 5 wherein the mass flow rate of the first portion of the burner means exhaust is two to three times the mass flow rate of the second portion of the burner means exhaust.

8. The method according to claim 1 wherein the fuel conditioning apparatus includes a thermal gasifier, and wherein said step of feeding the carbonaceous fuel and the first portion of the burner means exhaust into the fuel conditioning apparatus comprises first feeding the carbonaceous fuel and the first portion of the burner means exhaust into the thermal gasifier and then feeding the thermal gasifier exhaust into the catalytic reactor, said reactor being a steam reforming reactor and operating solely on the heat in the thermal gasifier exhaust.

9. The method according to claim 2 wherein said catalytic reactor is a steam reforming reactor and the heat for driving the steam reforming reaction is the sensible heat in said first portion of the burner means exhaust.

10. In the method of operating a fuel cell power plant comprising a plurality of fuel cells, turbocharger means, recycle burner means, vent burner means, and fuel conditioning apparatus including a catalytic steam reforming reactor for producing hydrogen, the steps of:
feeding a first portion of the fuel cell anode exhaust and a first portion of the fuel cell cathode exhaust into the recycle burner means and burning the same therein;
feeding a second portion of the fuel cell anode exhaust and a second portion of the fuel cell cathode exhaust into the vent burner means and burning said second portions therein;
compressing air in the turbocharger and delivering said compressed air into the cathode side of the fuel cells as the oxidant therefor;
driving the turbocharger using the energy in the vent burner means exhaust by delivering said vent burner means exhaust into said turbocharger;
feeding a carbonaceous fuel and the recycle burner means exhaust into the fuel conditioning apparatus and reacting the fuel therein to produce hydrogen; and
feeding the hydrogen so produced to the anode side of the fuel cells.

11. The method according to claim 10 wherein the fuel conditioning apparatus includes a thermal gasifier upstream of the catalytic reactor, and said step of feeding the carbonaceous fuel and recycle burner means exhaust into the fuel conditioning apparatus comprises feeding the carbonaceous fuel and recycle burner means exhaust into the thermal gasifier and feeding the thermal gasifier output into the catalytic reactor.

12. The method according to claim 10 including using at least some of the heat generated in the burner means to preheat at least one of either the anode and cathode exhausts upstream of the recycle burner means and vent burner means.

13. In the method of operating a fuel cell power plant comprising a plurality of fuel cells which operate on pressurized air as the oxidant and pressurized hydrogen as the fuel, the steps of:
combining and burning the fuel cell anode and cathode exhausts;
catalytically reacting carbonaceous fuel and a first portion of the combusted anode and cathode exhausts in an endothermic steam reforming reaction using only the sensible heat in the combusted anode and cathode exhausts to drive the steam reforming reaction;
introducing the hydrogen produced by the steam reforming reaction into the anode side of the fuel cells; and
using the energy of a second portion of the combusted anode and cathode exhausts to pressurize the air fed to the cathode side of the fuel cells.

14. A fuel cell power plant comprising:
a plurality of fuel cells each having a cathode side and an anode side;
a source of carbonaceous fuel;
a source of air;
turbocharger means for compressing said air;
fuel conditioning apparatus for producing hydrogen, said apparatus including a catalytic reactor;
means for combusting a mixture of anode side exhaust and cathode side exhaust, wherein the fuel for said combustion is hydrogen in the anode side exhaust and the oxidant for said combustion is in the cathode side exhaust;
means for introducing the anode side exhaust and the cathode side exhaust into said means for combusting;
means for introducing a carbonaceous fuel and a first portion of the combusted anode and cathode side exhausts into said fuel conditioning apparatus;
means for introducing the hydrogen produced in said fuel conditioning apparatus into said anode sides of said fuel cells as the fuel therefor;
means for delivering a second portion of the combusted anode and cathode side exhausts into said turbocharger means for driving said turbocharger means; and
means for introducing the air compressed by said turbocharger means into said cathode sides of said fuel cells as the oxidant therefor.

15. The fuel cell power plant according to claim 14 wherein said fuel conditioning apparatus includes a thermal gasifier upstream of said catalytic reactor.

16. The fuel cell power plant according to claim 14 wherein said means for combusting comprises a recycle burner and a vent burner, said means for introducing the anode and cathode side exhausts into said means for combusting comprises means for introducing a portion of each of said anode and cathode side exhausts into each of said recycle and vent burners, and wherein said first portion of the combusted anode and cathode side exhausts is the exhausts from said recycle burner and said second portion of said exhausts is the exhausts from said vent burner.

17. A method for operating a fuel cell power plant wherein the power plant includes a plurality of fuel cells each having an anode side and a cathode side, comprising the steps of:
mixing the exhaust from the anode sides of the fuel cells with the exhaust from the cathode sides of the fuel cells and combusting said mixture to produce a hot gas stream;

mixing a carbonaceous fuel with a first portion of said hot gas stream and converting said fuel to hydrogen using the energy in said first portion of said hot gas stream, said step of converting including catalytic steam reforming of said fuel;

delivering said hydrogen produced into the anode sides of said fuel cells;

pressurizing air in a turbocharger and delivering said pressurized air into the cathode sides of said fuel cells; and driving the turbocharger by delivering into said turbocharger a second portion of said hot gas stream.

18. The method of operating a fuel cell power plant, said power plant including a plurality of fuel cells each having an anode side and a cathode side, comprising the steps of:

mixing a first portion of the exhaust from the anode sides of the fuel cells with a first portion of the exhaust from the cathode sides of the fuel cells and combusting said mixture in a first burner to produce a first hot gas stream;

mixing a second portion of the exhaust from the anode sides of the fuel cells with a second portion of the exhaust from the cathode sides of the fuel cells and combusting said mixture to produce a second hot gas stream;

mixing a carbonaceous fuel with said first hot gas stream and converting said fuel to hydrogen using the energy in said first hot gas stream, said step of converting including catalytic steam reforming of said fuel;

delivering said hydrogen produced into the anode sides of said fuel cells;

pressurizing air in a turbocharger and delivering said pressurized air into the cathode sides of said fuel cells; and driving the turbocharger by delivering thereinto said second hot gas stream.

19. The method according to claim 18 wherein said step of converting includes thermally gasifying said fuel before steam reforming said fuel.

20. The method according to claim 18 including the step of preheating at least one of said first or second portions of either said anode sides exhaust or said cathode sides exhausts or said mixtures of said exhausts using the heat generated by combusting said mixtures.

* * * * *